United States Patent
Forsyth

[19]

[11] Patent Number: 5,830,099
[45] Date of Patent: Nov. 3, 1998

[54] REVERSE GEAR MECHANISM IN FRONT WHEEL DRIVE TRANSAXLES

[75] Inventor: John R. Forsyth, Romeo, Mich.

[73] Assignee: New Venture Gear, Inc., Troy, Mich.

[21] Appl. No.: 754,567

[22] Filed: Nov. 21, 1996

[51] Int. Cl.[6] .................................................. F16H 37/00
[52] U.S. Cl. .......................................................... 475/207
[58] Field of Search ........................... 74/322, 323, 324; 475/198, 201, 207

[56] References Cited

U.S. PATENT DOCUMENTS 4,228,697  10/1980  Miller .
4,351,196  9/1982  Yoshida et al. .......................... 475/207

Primary Examiner—Dirk Wright
Attorney, Agent, or Firm—Harness, Dickey & Pierce, P.L.C.

[57] ABSTRACT

A manual transmission for use in motor vehicles is disclosed. The transmission includes an input shaft, an output shaft and a plurality of constant mesh gearsets that can be selectively engaged for establishing corresponding forward gears therebetween. A reverse gear assembly is provided for establishing the reverse gear. The reverse gear assembly includes a differential having an input driven by the input shaft, an output meshed with an input gear rotatably supported on the input shaft and which is also meshed with a speed gear fixed to the output shaft, and a carrier assembly interconnecting the input and output members. A locking mechanism is provided for selectively inhibiting rotation of the carrier assembly so as to cause the output to be driven in an opposite direction relative to the input for providing a reverse gear.

16 Claims, 5 Drawing Sheets

REVERSE GEAR MECHANISM IN FRONT WHEEL DRIVE TRANSAXLES

BACKGROUND OF THE INVENTION

The present invention relates generally to multi-speed transmissions for motor vehicles. Specifically, the present invention is directed to a manual transmission having a locking differential for its reverse gear assembly.

As is well known, gear shifting in manual transmissions is effected by selectively bringing one of the gearsets into driving engagement for rotatably driving the output shaft at a predetermined speed ratio relative to the input shaft. While most manual transmissions include a plurality of synchromesh gearsets for establishing the forward gears, sliding-type gearsets are commonly used for establishing the reverse gear. Alternatively, some manual transmissions are equipped with a synchronized reverse arrangement for preventing the undesirable grinding associated with conventional sliding-type arrangements. While such arrangements appear to satisfactorily perform their desired function, a need still exists to provide alternatives to conventional reverse gear arrangements.

SUMMARY OF THE INVENTION

Accordingly, the present invention is directed to utilizing a differential as the reverse gear assembly in a multi-speed manual transmission having a carrier assembly that can be braked for reversing the direction of rotation of its output relative to its input.

In a preferred form, the differential has an input driven by the transmission input shaft, an output meshed with a gearset driving the transmission output shaft, and a carrier assembly interconnecting the input and output to facilitate relative rotation therebetween. A locking mechanism is operable in a first mode for permitting unrestricted rotation of the carrier assembly and in a second mode for inhibiting rotation thereof. The locking mechanism is shifted into its second mode to reverse the direction of rotation of the output relative to the input, thereby establishing the reverse gear.

BRIEF DESCRIPTION OF THE DRAWINGS

Further objects, features and advantages of the present invention will become apparent to those skilled in the transmission art from studying the following description and the accompanying drawings in which.

DETAILED DESCRIPTION OF THE INVENTION

Figure 1:
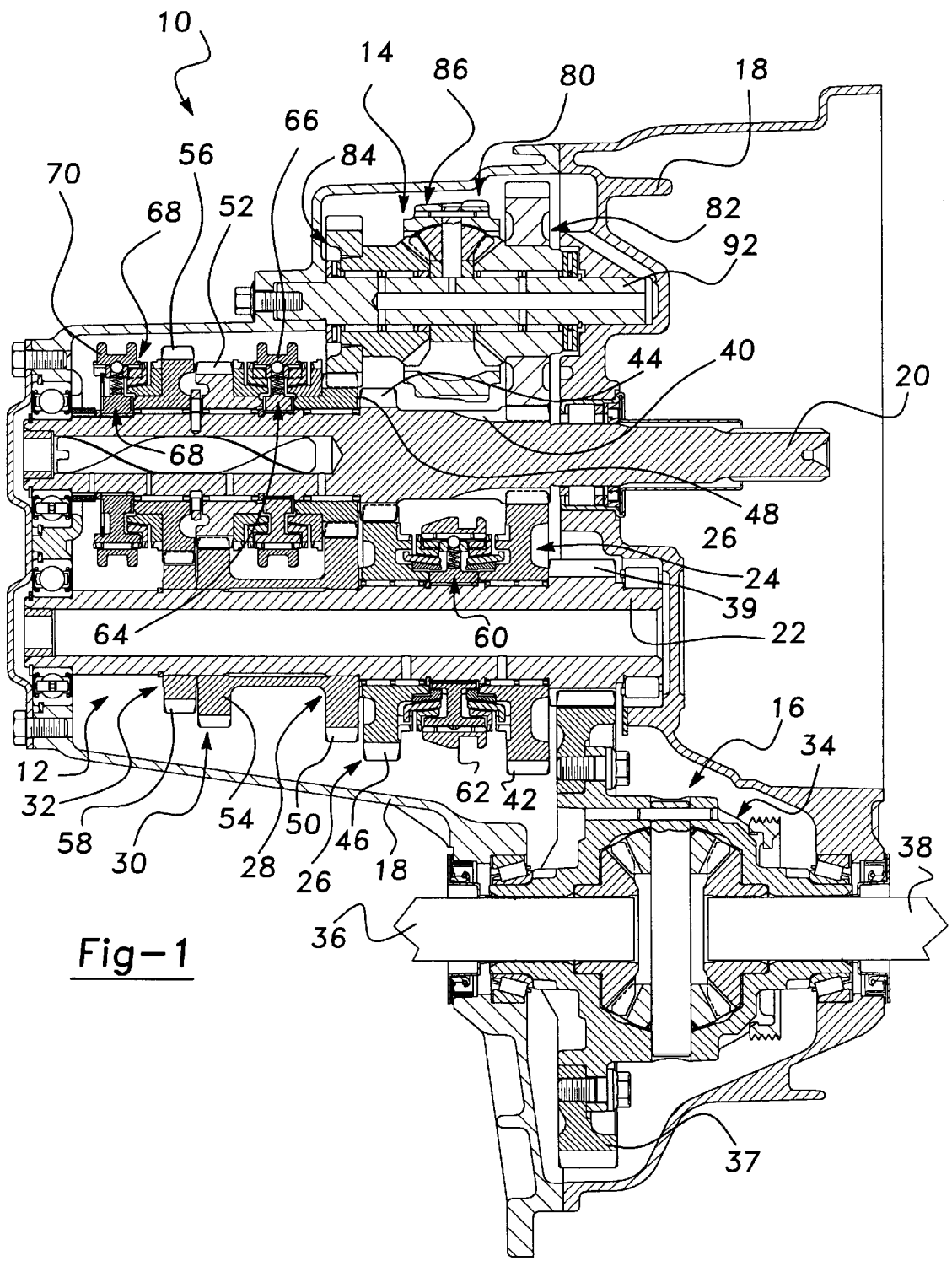
FIG. 1 is a section view of a multi-speed transmission equipped with a reverse gear assembly according to one embodiment of the present invention.

Referring to FIG. 1, a multi-speed transmission 10 is shown that is adapted for use in motor vehicles. In general, transmission 10 includes a multispeed geartrain 12, a reverse gear assembly 14, and a power output mechanism 16, all of which are operably mounted within a transmission housing 18. Geartrain 12 includes an input shaft 20 that is adapted to be rotatably driven by the output shaft of the motor vehicle's engine and which is connectable thereto through engagement of a manually-operable clutch (not shown). Geartrain 12 also includes a mainshaft 22 and a series of constant-mesh gearsets 24, 26, 28, 30 and 32. Each gearset can be selectively engaged for coupling mainshaft 22 to input shaft 20 for establishing five different forward speed ratios (i.e., five forward gears). Likewise, reverse gear assembly 14 can be selectively engaged for coupling mainshaft 22 to input shaft 20 for establish a reverse speed ratio (i.e., reverse gear). Power output mechanism 16 is rotatably driven by mainshaft 22 and includes a conventional differential assembly 34 that is operable for delivering drive torque to a pair of output shafts 36 and 38. A drive gear 37 is shown fixed to differential 34 and is in constant mesh with an output gear 39 formed on mainshaft 22. In the particular embodiment shown, transmission 10 is a FWD transaxle having output shafts 36 and 38 adapted for connection to the front wheels of the motor vehicle. As seen, input shaft 20, mainshaft 22, reverse gear assembly 14 and differential assembly 34 are all rotatably supported within housing 18 by suitable bearings.

With continued reference to FIG. 1, first gearset 24 is shown to include a first input gear 40 fixed to input shaft 20 and a first speed gear 42 rotatably supported on mainshaft 22. First input gear 40 is in constant mesh with first speed gear 42 for defining a first power transmission path from input shaft 20 to mainshaft 22 so as to establish the first speed ratio therebetween. Second gearset 26 includes a second input gear 44 fixed to input shaft 20 and a second speed gear 46 rotatably supported on mainshaft 22. Second input gear 44 is in constant mesh with second speed gear 46 for defining a second power transmission path from input shaft 20 to mainshaft 22 and establishing the second speed ratio therebetween. Third gearset 28 includes a third input gear 48 rotatably supported on input shaft 20 that is in constant mesh with a third speed gear 50 fixed to mainshaft 22 for defining a third power transmission path from input shaft 20 to mainshaft 22 and establishing the third speed ratio therebetween. Fourth gearset 30 includes a fourth input gear 52 rotatably supported on input shaft 20 and which is in constant mesh with a fourth speed gear 54 fixed to mainshaft 22 thereby establishing a fourth power transmission path at the fourth speed ratio therebetween. Finally, fifth gearset 32 includes a fifth input gear 56 rotatably supported on input shaft 20 and which is in constant mesh with a fifth speed gear 58 fixed to mainshaft 22 thereby establishing a fifth power transmission path and the fifth speed ratio therebetween.

As noted, geartrain 12 is arranged to selectively deliver drive torque from input shaft 20 to mainshaft 22 at one of five different speed ratios for establishing five different forward gears. To this end, each gearset of geartrain 12 is associated with a selectively engageable manually-actuated synchronizing clutch. In particular, a first synchronizer clutch 60 is operably installed between first gearset 24 and second gearset 26 on mainshaft 22 and includes a first shift sleeve 62. First shift sleeve 62 is supported for common rotation with mainshaft 22 and bi-directional axial movement for selectively coupling one of first and second gearsets 24 and 26, respectively, to mainshaft 22 for establishing either of the first or second forward gears. A second synchronizer clutch 64 is operably installed between third and fourth gearsets 28 and 30 on input shaft 20 and includes a second shift sleeve 66. Second shift sleeve 66 is supported on input shaft 20 for common rotation therewith and bi-directional axial movement thereon for selectively coupling one of third and fourth gearsets 28 and 30 to input shaft 20 for establishing either of the third or fourth forward gears. Finally, a third synchronizer clutch 68 is operably installed adjacent to fifth gearset 32 on input shaft 20 and includes a third shift sleeve 70 that is supported for rotation with input shaft 20 and is axially movable relative thereto for selectively coupling fifth gearset 32 to input shaft 20 for establishing the fifth forward gear. A suitable shift mechanism, diagrammatically represented by block 72 in FIG. 3, interconnects each of shift sleeves 62, 66 and 70 to a gearshift lever 74 that can be manipulated by the vehicle operator to select the desired forward gear. Shift mechanism 72 can be any known mechanical, hydraulic, or electrically-actuated system capable of coordinating movement of shift sleeves 62, 66 and 70. As seen in FIG. 1, each of shift sleeves 62, 66 and 70 is shown positioned in a central or non-engaged position for establishing a neutral mode in which drive torque is not transferred from input shaft 20 to mainshaft to 22 at a forward speed ratio. Finally, each of synchronizer clutches 60, 64, and 68 can be of any conventional construction currently known in the manual transmission art.

Figure 2:
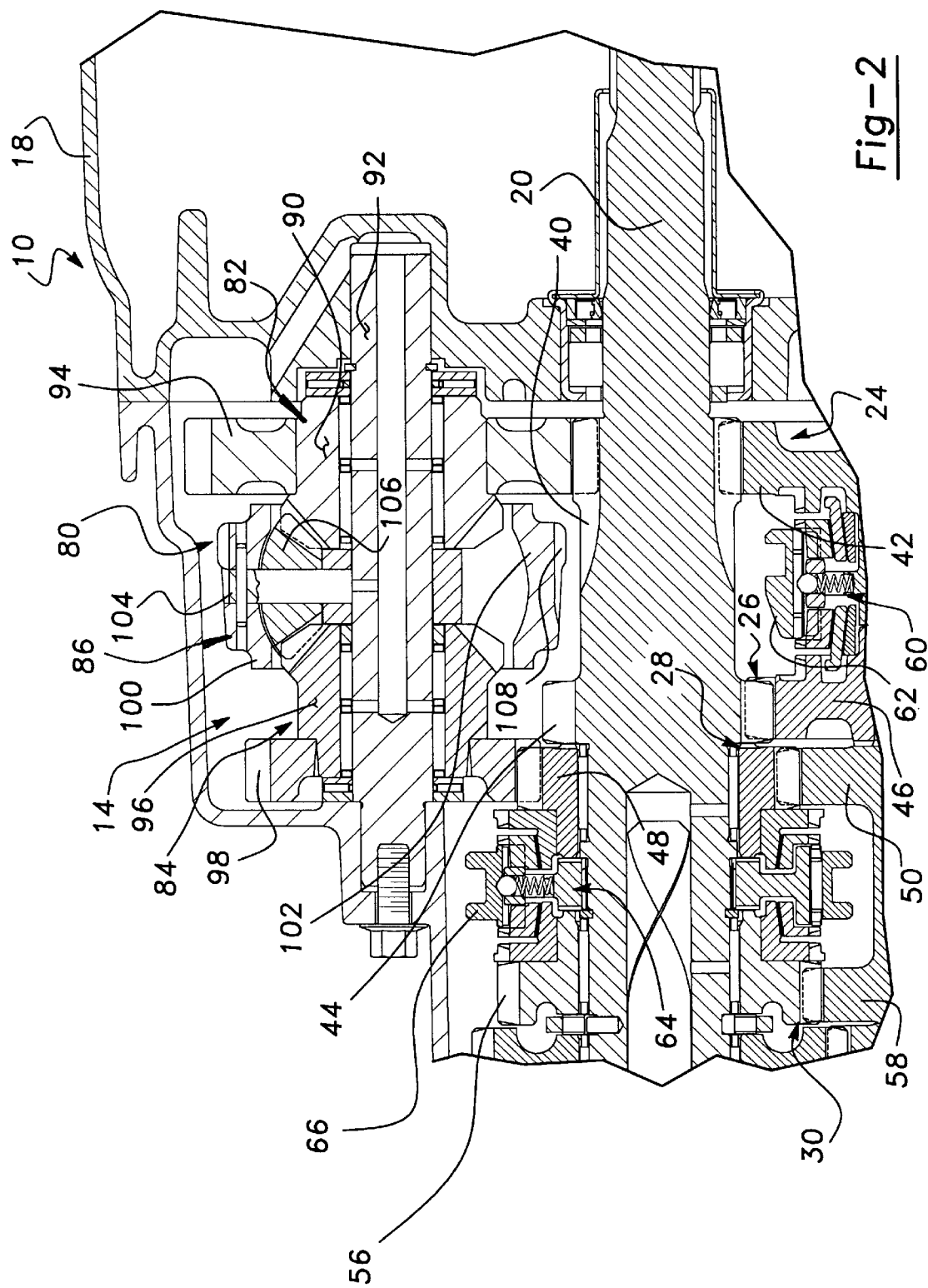
FIG. 2 is an enlarged partial view of FIG. 1 showing the components of the reverse gear assembly in greater detail.

To provide means for establishing the reverse gear, reverse gear assembly 14 is provided. In general, reverse gear assembly 14 is a differential 80 having an input 82 driven by input shaft 20, an output 84 that is in constant meshed engagement with one of the input gears rotatably supported on input shaft 20, a carrier assembly 86 that interconnects input 82 and output 84 for facilitating relative rotation therebetween. Reverse gear assembly 14 also includes a locking mechanism 88 that can be selectively actuated for stopping rotation of carrier assembly 86. Referring specifically to FIG. 2, input 82 of differential 80 is shown to include a first side gear 90 rotatably supported on a shaft 92, and a first reverse gear 94 fixed to first side gear 90. First reverse gear 94 is shown to be in constant meshed engagement with first input gear 40 so as to be driven directly by input shaft 20. Output 84 of differential 80 is shown to include a second side gear 96 rotatably supported on shaft 92, and a second reverse gear 98 fixed to second side gear 96. Second reverse gear 98 is in constant meshed engagement with third input gear 48 so as to drive or be driven thereby. Shaft 92 is shown to be non-rotatably mounted to housing 18. It is contemplated that shaft 92 could be eliminated with side gears 90 and 96 rotatably supported from housing 18. Carrier assembly 86 includes a pair of carrier rings 100 and 102 that are suitably interconnected and which support a plurality of pinion shafts 104 (one shown) therefrom. A pinion gear 106 (one shown) is rotatably supported on each pinion shaft 104 and in constant mesh with both first side gear 90 and second side gear 96. A series of locking teeth 108 are formed on the external surface of carrier ring 102.

Figure 3:
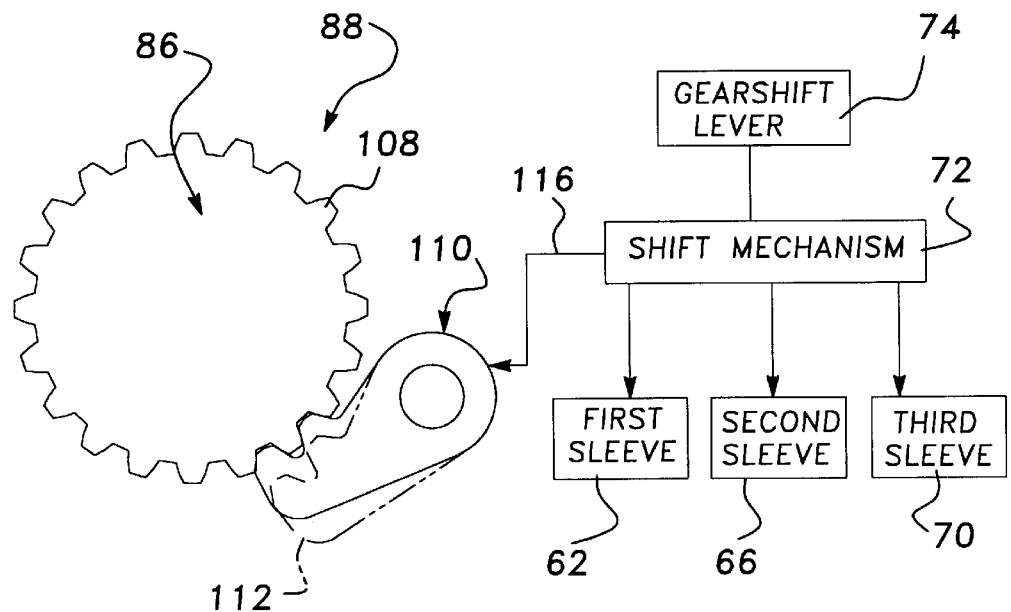
FIG. 3 is a schematic representation of the locking mechanism and shift mechanism associated with the reverse gear assembly shown in FIGS. 1 and 2.

Referring to FIG. 3, locking mechanism 88 is shown to include a locking pawl 110 that is supported in housing 18 for pivotal movement between a first position and a second position. In the first position (shown in phantom), dog teeth 112 on locking pawl 110 are displaced from carrier locking teeth 108 for permitting unrestricted rotation of carrier assembly 86. With locking pawl 110 in its first position, locking mechanism 88 is defined as operating in its "released" mode. Moreover, locking pawl 110 is maintained in this first position when geartrain 12 is shifted into and operating in any of its five forward gears. With locking pawl 110 in its second position, dog teeth 112 engage locking teeth 108, thereby braking rotation of carrier assembly 86. In the second position, locking mechanism 88 is defined as operating in its "locked" mode. Shift mechanism 72 is operable to ensure that locking pawl 110 is only moved to its second position for establishing the reverse gear when shift sleeves 62, 66 and 70 are each positioned in its non-engaged position. A linkage is diagrammatically shown by lead line 116 for coupling locking pawl 110 to shift mechanism 72 for coordinating movement of locking pawl 110 and the shift sleeves in response to actuation of gearshift lever 74. It is contemplated that linkage 116 could be any mechanical, hydraulic or electrically-actuated arrangement suitable for moving locking pawl 110 from its first position to its second position in response to gearshift lever 74 being shifted out of a forward gear position and into the reverse gear position, and vise versa.

In operation, when it is desired to shift transmission 10 into its reverse mode of operation, locking mechanism 88 is shifted into its locked mode such that locking pawl 110 is moved to its second position. In this position, first side gear 90 is directly driven at a reduced speed and in the opposite direction as input shaft 20. However, due to carrier assembly 86 being held against rotation, rotation of first side gear 90 causes second side gear 96 to be rotatably driven in the opposite direction. Since second reverse gear 98 is fixed to second side gear 96, second reverse gear 98 causes third input gear 48 to also be rotatably driven which, in turn, drives third speed gear 50 and mainshaft 22. Thus, mainshaft 22 is driven through third gearset 28 in a direction opposite to the direction it is normally driven during operation in one of the forward gears. The speed ratio for the reverse gear is determined by the combination of input gear 40 driving first reverse gear 94, second reverse gear 98 driving third gearset 28, and the gear geometry of differential 80. When it is desired to shift out of reverse gear into a forward gear, locking pawl 110 is moved to its first position for releasing carrier assembly 86, whereby side gears 90 and 96 are permitted to rotate in the same direction. Thereafter, shift mechanism 72 can shift one of the shift sleeves to an engaged position for establishing the corresponding forward gear. Since first gearset 24 and third gearset 28 are never engaged concurrently, side gears 90 and 96 are free to rotate relative to each other during forward operation of transmission 10. Thus, it is possible that input 82 of reverse gear assembly 14 could alternatively be associated with second input gear 44 while output 84 could alternatively be associated with either fourth gearset 30 or fifth gearset 32, if so desired.

Figure 6:
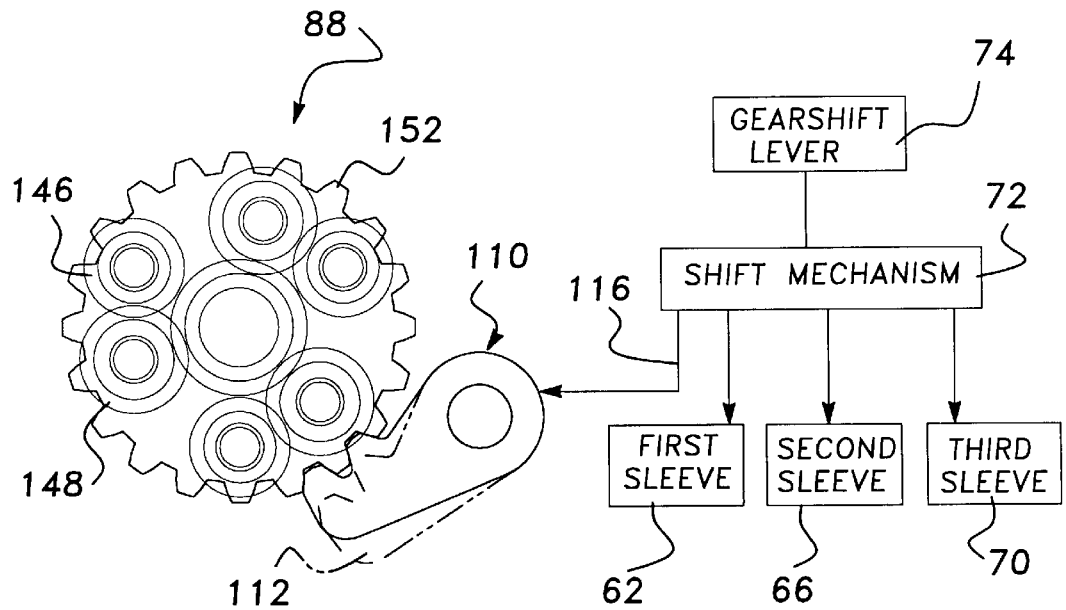
FIG. 6 is a schematic representation of the locking mechanism and shift mechanism associated with the reverse gear assembly shown in FIGS. 4 and 5.
Figure 4:
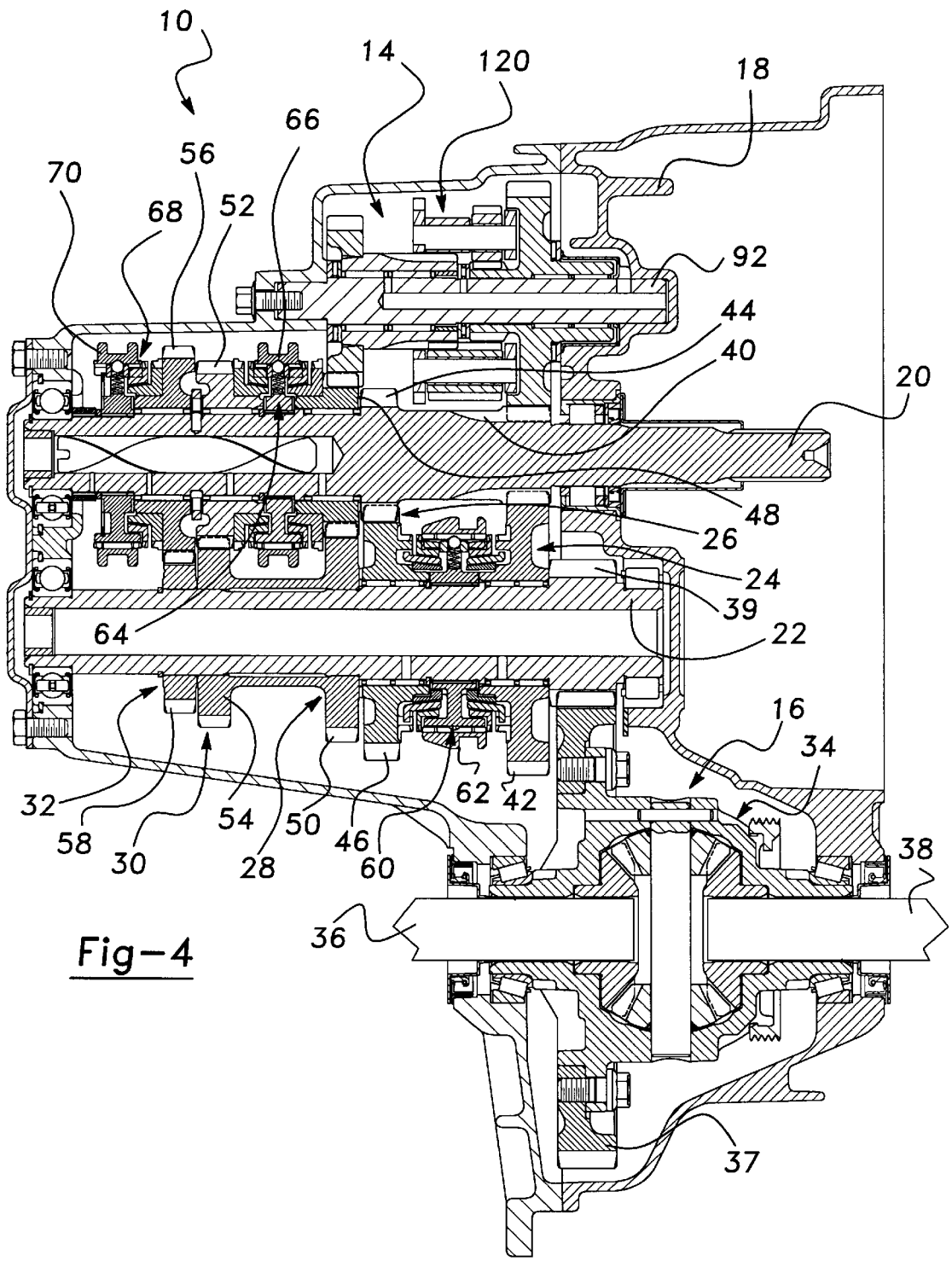
FIG. 4 is a section view of the multi-speed transmission equipped with a reverse gear assembly according to a second embodiment of the present invention.
Figure 5:
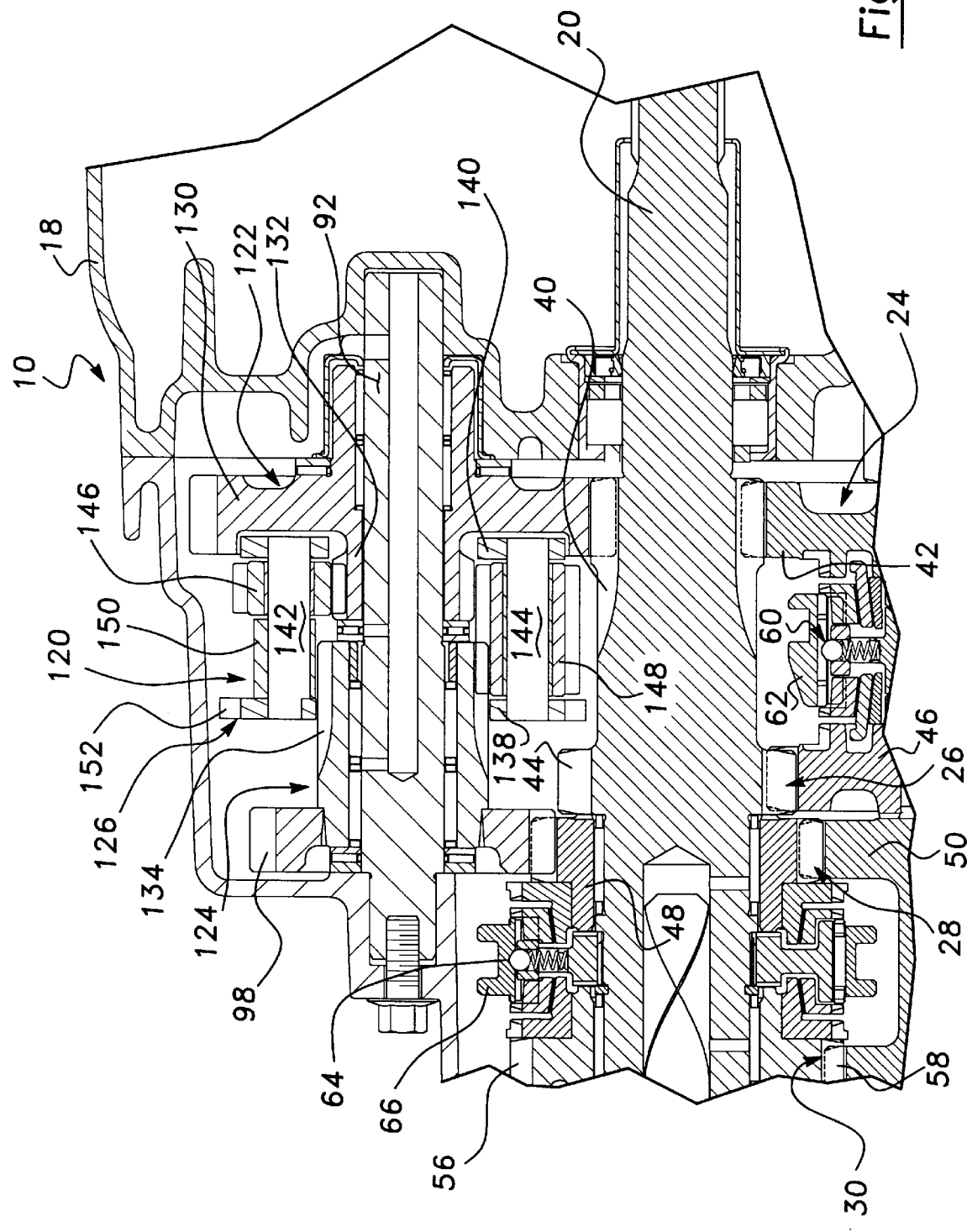
FIG. 5 is an enlarged partial view of the transmission shown in FIG. 4.

Referring now to FIGS. 4 through 6, an alternative construction for reverse gear assembly 14 is shown incorporated into transmission 10. In general, pinion-type differential 80 has been replaced by a planetary-type differential 120 but which functions in a similar direction-reversing manner for establishing the reverse gear. In view of the similarity of most components, like reference numbers are used to identify those components shown in FIGS. 4 through 6 that are identical or substantially similar in structure and/or function to those previously disclosed.

Planetary differential 120 is a dual-planetary gear assembly having an input 122 driven by input shaft 20, an output 124 in meshed engagement with third input gear 48, a carrier assembly 126 interconnecting input 122 and output 124 for relative rotation therebetween, and a locking mechanism 88 for selectively stopping rotation of carrier assembly 126. Input 122 is shown to include a first reverse gear 130 rotatably supported on shaft 92 and having a first sun gear 132 formed thereon. Output 124 is shown to include a second sun gear 134 rotatably supported on shaft 92, and a second reverse gear 98 fixed to second sun gear 134. Carrier assembly 126 includes a pair of carrier rings 138 and 140 that are suitably interconnected and which support a plurality of first pinion shafts 142 (one shown) and second pinion shafts 144 (one shown) therebetween. A first planet gear 146 is rotatably supported on each first pinion shaft 142 and is in constant meshed engagement with first sun gear 132. Likewise, a second planet gear 148 is rotatably supported on each second pinion shaft 144 and is in constant meshed engagement with second sun gear 134. As shown, first planet gears 146 are one-half length gears with spacers 150 providing axial location on pinion shafts 142 while second planet gears 148 are full length gears. Preferably, planet gears 146 and 148 are arranged in a series of meshed pairs such that each one of first planet gears 146 is also arranged in meshed engagement with one of second planet gears 148. A series of locking teeth 152 are formed on the external surface of carrier ring 138.

Referring to FIG. 6, locking mechanism 88 is shown to again include a locking pawl 110 that is supported for pivotably movement between its first and second positions. With locking pawl 110 in the first position (shown in phantom), dog teeth 112 are displaced from carrier locking teeth 152 for permitting unrestricted rotation of carrier assembly 126. As before, locking pawl 110 is maintained in this first position when geartrain 12 is operating in any one of its five forward gears. However, with locking pawl 110 in the second position, dog teeth 112 engage locking teeth 152 for braking rotation of carrier assembly 126, thereby reversing the direction of rotation of second reverse gear 98 relative to first reverse gear 130. As before, locking pawl 110 is moved to its second position for establishing the reverse gear with each of shift sleeves 62, 66 and 70 positioned in its non-engaged position.

In operation, when it is desired to shift transmission 10 into its reverse gear, locking mechanism 88 is shifted into its locked mode for moving locking pawl 110 to its second position. In this position, first sun gear 132 is directly driven at a reduced speed and in the opposite direction as input shaft 20. Due to carrier assembly 126 being held stationary, such rotation of first sun gear 132 causes second sun gear 134 to be driven in the opposite direction. Since second reverse gear 98 is fixed to second sun gear 134, second reverse gear 98 causes third input gear 48 to also be rotatably driven which, in turn, drives third speed gear 50 and mainshaft 22. Thus, mainshaft 22 is driven through third gearset 28 in the direction opposite to the direction it is normally driven during forward operation. The reverse speed ratio is determined by the combination of input gear 40 driving first reverse gear 130, second reverse gear 98 driving third gearset 28, and the gear geometry associated with planetary gear assembly 120. As mentioned before, it is possible that input 122 could alternatively be associated with second input gear 44 while output 124 could be associated with either fourth gearset 30 or fifth gearset 32.

Figure 7:
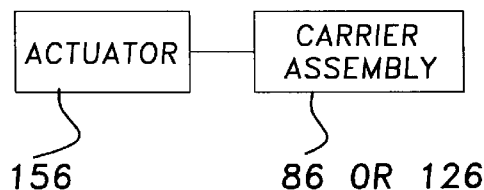
FIG. 7 is a diagrammatic illustration embodying alternative locking mechanisms for use with either of the reverse gear assemblies.

It is also contemplated that locking mechanism 88 described above could be substituted with alternative arrangements that are operable for selectively braking rotation of either of carrier assemblies 86 or 116 such as, for example, conventional synchronizer clutches or band brakes. In particular, FIG. 7 is a schematic illustration provided to define, without limitation, various alternatives to the above-noted locking mechanism 88. In particular, block 156 refers to an actuator that can be selectively actuated to stop rotation of carrier assembly 86 or 116 when transmission 10 is shifted into its reverse gear. Actuator 146 can be any mechanically, hydraulically, or electrically actuated clutch, brake or other suitable device capable of operation in a first mode for releasing carrier assembly 86 or 116 and in a second mode for inhibiting rotation of carrier assembly 86 of 116.

The foregoing discussion discloses and describes exemplary embodiments of the present invention. For example, either embodiment of reverse gear assembly 14 can be used in other multi-speed geartrain arrangements and thus are not limited to use with the particular five-speed arrangement disclosed, Accordingly, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transmission comprising:

a first shaft;

a second shaft;

a first gearset having a first input gear fixed to said first shaft and meshed with a first speed gear rotatably supported on said second shaft;

a first clutch for selectively coupling said first speed gear to said second shaft to provide a first forward gear;

a second gearset having a second input gear rotatably supported on said first shaft and meshed with a second speed gear fixed to said second shaft;

a second clutch for selectively coupling said second input gear to said first shaft to provide a second forward gear;

a reverse gear assembly having an input rotatably driven by said first input gear, an output meshed with said second input gear, and a carrier assembly interconnecting said input to said output for facilitating relative rotation therebetween; and a locking mechanism for selectively inhibiting rotation of said carrier assembly so as to cause said output to be driven in an opposite direction relative to said input for providing a reverse gear.

2. The transmission of claim 1 wherein said input includes a first reverse gear meshed with said first input gear, said output includes a second reverse gear meshed with said second input gear, and wherein said carrier assembly rotatably interconnects said first reverse gear and said second reverse gear for facilitating relative rotation therebetween.

3. The transmission of claim 2 wherein said input includes a first side gear fixed to said first reverse gear, said output includes a second side gear fixed to said second reverse gear, and said carrier assembly includes pinion gears meshed with each of said first and second side gears.

4. The transmission of claim 2 wherein said input includes a first sun gear fixed to said first reverse gear, said output includes a second sun gear fixed to said second reverse gear, and said carrier assembly includes a first planet gear meshed with said first sun gear and a second planet gear meshed with said second sun gear and said first planet gear.

5. The transmission of claim 1 wherein said locking mechanism is maintained in a released mode for permitting rotation of said carrier assembly when operating in said first and second forward gears, and wherein said locking mechanism is shifted into a locked mode for inhibiting rotation of said carrier assembly to provide said reverse gear.

6. The transmission of claim 1 wherein said carrier assembly includes locking teeth, and wherein said locking mechanism includes a locking pawl having dog teeth, said locking pawl being selectively movable between a first position whereat said dog teeth are displaced from said locking teeth for permitting rotation of said carrier assembly and a second position whereat said dog teeth engage said locking teeth for inhibiting rotation of said carrier assembly.

7. A transmission comprising:

a first shaft;

a second shaft;

a gearset having an input gear rotatably supported on said first shaft and meshed with a speed gear fixed to said second shaft;

a clutch for coupling said input gear to said first shaft to provide a forward gear;

a reverse gear assembly having an input rotatably driven by said first shaft, an output meshed with said input gear, and a carrier assembly interconnecting said input and said output for facilitating relative rotation therebetween; and a locking mechanism for selectively inhibiting rotation of said carrier assembly so as to cause said output to be driven in an opposite direction relative to said input for providing a reverse gear.

8. The transmission of claim 7 wherein said input includes a first reverse gear rotatably driven by said first shaft, said output includes a second reverse gear meshed with said input gear, and wherein said carrier assembly rotatably interconnects said first reverse gear to said second reverse gear for facilitating relative rotation therebetween.

9. The transmission of claim 8 wherein said input further includes a first side gear fixed to said first reverse gear, said output further includes a second side gear fixed to said second reverse gear, and said carrier assembly includes pinion gears meshed with each of said first and second side gears.

10. The transmission of claim 8 wherein said input further includes a first sun gear fixed to said first reverse gear, said output further includes a second sun gear fixed to said second reverse gear, and said carrier assembly includes a first planet gear meshed with said first sun gear and a second planet gear meshed with said second sun gear and said first planet gear.

11. The transmission of claim 7 wherein said carrier assembly includes locking teeth, and wherein said locking mechanism includes a locking pawl having dog teeth that are selectively engageable with said locking teeth, said locking pawl being movable between a first position whereat said dog teeth are displaced from said locking teeth for permitting rotation of said carrier assembly and a second position whereat said dog teeth engage said locking teeth for inhibiting rotation of said carrier assembly.

12. A transmission comprising:

a first shaft;

a second shaft;

an input gear rotatably supported on said first shaft;

a speed gear fixed to said second shaft and meshed with said input gear;

a first clutch for selectively coupling said input gear to said first shaft to provide a forward gear;

a reverse gear assembly having an input rotatably driven by said first shaft, an output meshed with said input gear, and a carrier assembly interconnecting said input and said output for facilitating relative rotation therebetween;

a second clutch for selectively stopping rotation of said carrier assembly so as to cause said output to be driven in an opposite direction relative to said input for providing a reverse gear; and a shift mechanism for controlling actuation of said first clutch and said second clutch.

13. The transmission of claim 12 wherein said input includes a first reverse gear rotatably driven by said first shaft, said output includes a second reverse gear meshed with said input gear, and said carrier assembly rotatably interconnects said first reverse gear to said second reverse gear for facilitating relative rotation therebetween.

14. The transmission of claim 12 wherein said input further includes a first side gear fixed to said first reverse gear, said output further includes a second side gear fixed to said second reverse gear, and said carrier assembly includes pinion gears meshed with each of said first and second side gears.

15. The transmission of claim 12 wherein said input further includes a first sun gear fixed to said first reverse gear, said output further includes a second sun gear fixed to said second reverse gear, and wherein said carrier assembly includes a first planet gear meshed with said first sun gear and a second planet gear meshed with said second sun gear and said first planet gear.

16. A transmission for a motor vehicle comprising:

an input shaft;

a mainshaft;

a first gearset having a first input gear fixed to said input shaft and meshed with a first speed gear rotatably supported on said mainshaft;

a first clutch for selectively coupling said first speed gear to said mainshaft for defining a first power transmission path from said input shaft to said mainshaft to provide a first forward gear;

a second gearset having a second input gear rotatably supported on said input shaft and meshed with a second speed gear fixed to said mainshaft;

a second clutch for selectively coupling said second input gear to said input shaft for defining a second power transmission path from said input shaft to said mainshaft so as to establish a second forward gear;

a reverse gear assembly including a first reverse gear meshed with said first input gear, a second reverse gear meshed with said second input gear, and a differential interconnecting said first reverse gear and said second reverse gear for facilitating speed differentiation therebetween, said differential including a first member fixed to said first reverse gear, a second member fixed to said second reverse gear, and a carrier assembly rotatably interconnecting said first member to said second member;

a locking mechanism for selectively inhibiting rotation of said carrier assembly so as to cause said second reverse gear to be driven in an opposite direction relative to said first reverse gear for establishing a reverse gear; and a shift mechanism for controlling actuation of said first clutch, said second clutch and said locking mechanism.

* * * * *